(12) United States Patent
Kobayashi et al.

(10) Patent No.: US 11,649,972 B2
(45) Date of Patent: May 16, 2023

(54) GAS CONDITIONER

(71) Applicant: SUMITOMO PRECISION PRODUCTS CO., LTD., Amagasaki (JP)

(72) Inventors: Tomohiro Kobayashi, Amagasaki (JP); Tatsuya Yamakawa, Amagasaki (JP); Masaya Yoshimura, Amagasaki (JP); Ryo Fujita, Amagasaki (JP)

(73) Assignee: SUMITOMO PRECISION PRODUCTS CO., LTD., Amagasaki (JP)

( * ) Notice: Subject to any disclaimer, the term of this patent is extended or adjusted under 35 U.S.C. 154(b) by 248 days.

(21) Appl. No.: 17/277,136

(22) PCT Filed: Jun. 25, 2019

(86) PCT No.: PCT/JP2019/025235
§ 371 (c)(1),
(2) Date: Dec. 8, 2021

(87) PCT Pub. No.: WO2020/059238
PCT Pub. Date: Mar. 26, 2020

(65) Prior Publication Data
US 2022/0113041 A1    Apr. 14, 2022
US 2022/0113041 A1    Apr. 14, 2022

(30) Foreign Application Priority Data
Sep. 20, 2018    (JP) .............................. JP2018-176536

(51) Int. Cl.
*F24F 3/14*    (2006.01)
*B01F 23/21*   (2022.01)
*C01B 13/11*   (2006.01)

(52) U.S. Cl.
CPC ................ *F24F 3/14* (2013.01); *B01F 23/21* (2022.01); *C01B 13/11* (2013.01); *F24F 2003/1435* (2013.01)

(58) Field of Classification Search
CPC .................................. F24F 3/14; B01F 23/21
See application file for complete search history.

(56) References Cited

U.S. PATENT DOCUMENTS

| 4,708,831 A | 11/1987 | Elsworth et al. |
| 2009/0130495 A1 | 5/2009 | Terasaki et al. |
| 2016/0339380 A1 | 11/2016 | Betts et al. |

FOREIGN PATENT DOCUMENTS

| CN | 101238606 A | 8/2008 |
| CN | 106129437 A | 11/2016 |
| CN | 106471315 A | 3/2017 |

(Continued)

OTHER PUBLICATIONS

International Searching Authority, International Search Report and Written Opinion for International Application No. PCT/JP2019/025235, dated Aug. 6, 2019, (9 pages), Japan Patent Office, Tokyo, Japan.

*Primary Examiner* — Robert A Hopkins
(74) *Attorney, Agent, or Firm* — Alston & Bird LLP

(57) ABSTRACT

A gas conditioner 60 comprises: a case 62 that forms a gas flowpath 61 through which gas flows; and resin members 80 that are provided to the gas flowpath 61 and that are water permeable. The resin members 80 are formed of sealed hollow bodies that are filled with water.

9 Claims, 4 Drawing Sheets

(56) References Cited

FOREIGN PATENT DOCUMENTS

| | | |
|---|---:|---:|
| EP | 1291588 A1 | 3/2003 |
| JP | 2001-340458 A | 12/2001 |
| JP | 2002-029710 A | 1/2002 |
| JP | 2004-217512 A | 8/2004 |
| JP | 2005-337640 A | 12/2005 |
| JP | 2006078110 A * | 3/2006 |
| JP | 4166928 B2 | 10/2008 |
| JP | 2014-035244 A | 2/2014 |
| WO | WO-2015/093079 A1 | 6/2014 |

* cited by examiner

GAS CONDITIONER

CROSS REFERENCE TO RELATED APPLICATIONS

This application is a national stage application, filed under 35 U.S.C. § 371, of International Application No. PCT/JP2019/025235, filed Jun. 25, 2019, which international application claims priority to and the benefit of Japanese Application No. 2018-176536, filed Sep. 20, 2018, the contents of both of which as are hereby incorporated by reference in their entireties.

BACKGROUND

Technical Field

The present invention relates to a gas conditioner.

Description of Related Art

An ozone generator that generates an ozone gas using an oxygen gas as a raw material is widely used for semiconductor manufacturing process and other processes.

As an ozone generator of this type, Japanese Patent No. 4166928 describes a generator including humidifiers (gas conditioner) that add water to an oxygen gas. Specifically, in the ozone generator, humidifiers 4 are connected in series between an oxygen gas source and an ozonizer. An oxygen gas supplied from the oxygen gas source 2 is provided with a trace amount of water in the humidifiers 4, and then is supplied to the ozonizer 9. Accordingly, a moisture content in the oxygen gas supplied to the ozonizer 9 is adjusted to a target range (e.g., 0.05 to 40 ppm). In the manner described above, a trace amount of water is added to the oxygen gas so that a decrease in ozone concentration of a resulting ozone gas is reduced.

BRIEF SUMMARY

In a gas conditioner as described in Japanese Patent No. 4166928, water to be added to a gas needs to be transported by, for example, pump. In the case of adding a trace amount of water to a gas by a gas conditioner, the amount of water supplied to the gas significantly changes with a variation in water temperature. For this reason, it is necessary to control the temperature of water to be transported. This necessity results in a problem of complicated configurations of a gas conditioner and ancillary equipment thereof.

The present invention has been made in view of such a problem and provides a gas conditioner capable of stably adjusting the amount of water added to a gas with a relatively simple configuration.

According to the present invention, to solve the problem, a resin member constituted by a hermetic hollow material enclosing water is disposed in a gas channel.

Specifically, the present invention is directed to a gas conditioner configured to add water to a gas, and the gas conditioner includes a case forming a gas channel in which a gas is distributed, and a resin member disposed in the gas channel and having water permeability, and the resin member is constituted by a hermetic hollow material configured to enclose water.

According to the present invention, when the gas flowing in the gas channel flows around the hollow material, water in the resin member passes through the resin member and moves into the gas. In this manner, a trace amount of water can be added to the gas. The resin member is a hermetic hollow material configured to enclose water, and is not configured to be supplied with water as necessary. Thus, a pump or the like for transporting water is unnecessary, and the water temperature control is unnecessary. Accordingly, the configuration of the gas conditioner can be simplified. Since the amount of water added to the gas is extremely small, the rate of a decrease in water content in the resin member is extremely low. Accordingly, a period until water in the resin member runs out is sufficiently long.

In the gas conditioner, the resin member preferably includes a plurality of resin members, and the gas conditioner further preferably includes a support configured to support the plurality of resin members such that the plurality of resin members are allowed to be attached to and detached from the support.

With this configuration, the number of resin members disposed in the gas channel can be easily changed. When the number of the resin members is changed, the amount of water added to the gas can be adjusted. Accordingly, an appropriate amount of water can be added to the gas in accordance with a gas flow rate and/or a target moisture concentration. The resin members are configured to be detachably attached to the support. Thus, the number of resin members can be easily changed and the resin members can be easily replaced.

The resin member preferably includes a tubular peripheral wall portion, and a closing portion configured to close each end of the peripheral wall portion, and the closing portion is preferably constituted by a welded portion of a resin material.

The ends of the peripheral wall portion of the resin member are welded so that openings at the ends of the peripheral wall portion can be closed by the closing portions (welded portions). Accordingly, a hermetic hollow material enclosing water can be easily produced.

The resin member preferably has a helical shape. The helical shape of the resin member can increase the volume and the surface area of the resin member. When the volume of the resin member increases, a period until water in the resin member runs out can be prolonged. When the surface area of the resin member increases, the amount of water capable of being added to a gas in one resin member can be increased. Thus, the resin member and the case can be miniaturized.

The case is preferably made of a metal material and disposed in an air conditioning space where an air temperature is adjusted.

In the case where the case is made of a metal material, the case has a relatively high thermal conductivity. Thus, the gas temperature in the case easily approaches the temperature around the case. The temperature around the case is adjustable by air conditioning, and thus, the gas temperature in the case can be indirectly adjusted. Since the temperature of water in the resin member is not controlled, this water temperature is dominated by a gas temperature in the gas channel and the temperature around the case. Accordingly, the water temperature in the resin member can be controlled by air conditioning so that the amount of water added to a gas can be thereby accurately adjusted. In addition, since the case is made of a metal material, leakage of a gas from the gas channel can be reduced.

The present invention can provide a gas conditioner capable of stably adjusting the amount of water added to a gas with a relatively simple configuration.

DETAILED DESCRIPTION OF VARIOUS EMBODIMENTS

Exemplary Embodiment

An embodiment of the present invention will be described in detail with reference to the drawings. The following embodiment is merely a preferred example in nature, and is not intended to limit the invention, applications, and use of the application.

<Embodiment Details>

Figure 1:
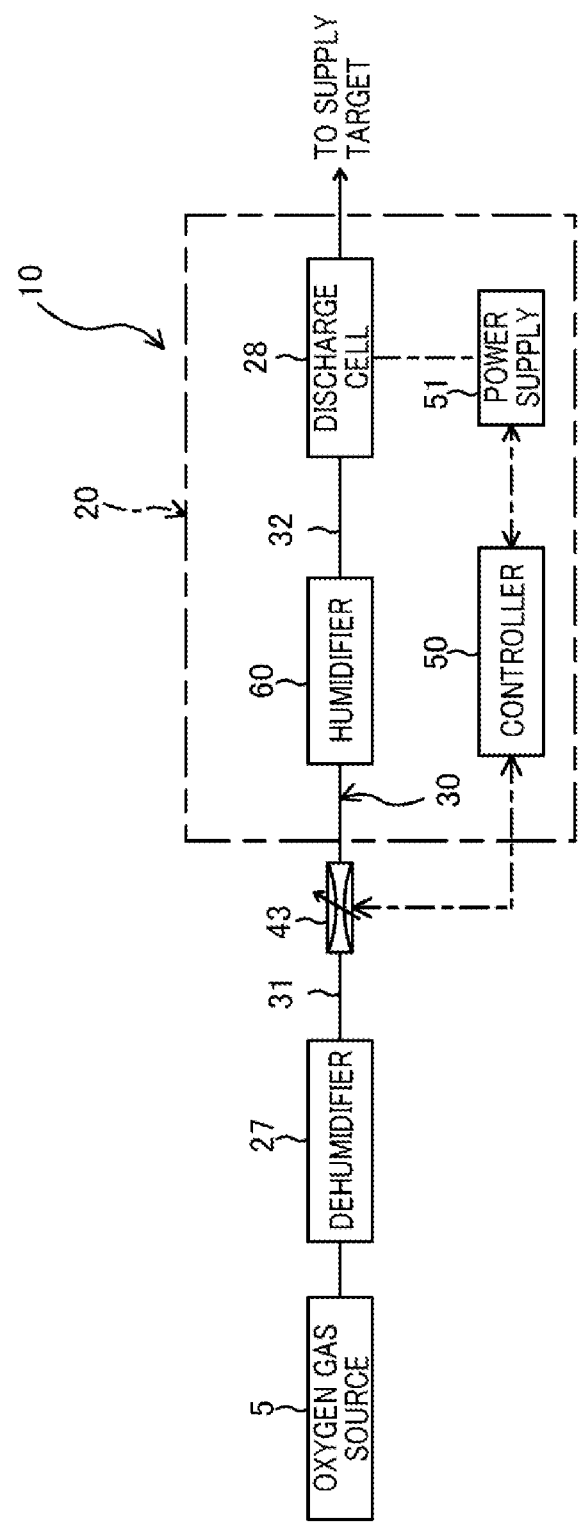
FIG. 1 is a schematic configuration diagram of an ozone generator according to an embodiment.

A gas conditioner according to an embodiment is applied to an ozone generator 10. As illustrated in FIG. 1, the ozone generator 10 uses, as a raw material, an oxygen gas supplied from an oxygen gas source 5, and supplies an ozone gas generated by using the raw material to a predetermined supply target. The oxygen gas source 5 is, for example, an oxygen gas cylinder filled with an oxygen gas. The oxygen gas cylinder is filled with, for example, an oxygen gas having a high purity of 99.9999%. The oxygen gas has a moisture content of, for example, 50 ppb to 1000 ppb. The supply target of the ozone gas is, for example, semiconductor manufacturing facilities.

The ozone generator 10 includes a dehumidifier 27 and a device body 20. The device body 20 includes, as main components, a humidifier 60, a discharge cell 28, a controller 50, and a power supply 51. The dehumidifier 27 may be omitted. The device body 20 includes a supply channel 30 as a main gas channel. The supply channel 30 includes a first channel 31 extending from the outside of the device body 20 to the humidifier 60, and a second channel 32 extending from the humidifier 60 to the discharge cell 28.

An inflow end of the supply channel 30 is connected to the dehumidifier 27 connected to the oxygen gas source 5. An outflow end of the supply channel 30 is connected to the discharge cell 28. The dehumidifier 27 is an adsorption-type dehumidifier that selectively adsorbs moisture in an oxygen gas, for example. The dehumidifier 27 removes the moisture such that the moisture content of the oxygen gas becomes 10 ppb or less. That is, the moisture content of the oxygen gas that has passed through the dehumidifier 27 is substantially zero.

The first channel 31 receives an oxygen gas from which moisture has been removed in the dehumidifier 27. The outflow end of the first channel 31 is connected to the humidifier 60 that adds water to the oxygen gas. The second channel 32 located downstream of the humidifier 60 is configured to cause an oxygen gas that has passed through the humidifier 60 to flow out. That is, the first channel 31 has the inflow end connected to the dehumidifier 27, and the outflow end connected to the humidifier 60. The second channel 32 has the inflow end connected to the humidifier 60, and the outflow end connected to the discharge cell 28.

The humidifier 60 constitutes a gas conditioner that adds water to an oxygen gas. The humidifier 60 adds water in resin tubes 80 having water permeability to a gas. The oxygen gas to which water has been added in the humidifier 60 flows out to the second channel 32. The oxygen gas humidified by the humidifier 60 has a moisture content of, for example, 300 ppb to 2000 ppb.

The first channel 31 has a flow control vale 43. The flow control vale 43 adjusts a flow rate of an oxygen gas that has flowed out of the dehumidifier 27 (i.e., a raw material gas to be supplied to the device body 20).

The discharge cell 28 generates an ozone gas by using an oxygen gas that has flowed out of the second channel 32 as a raw material. The discharge cell 28 is a silent discharge-type ozone generator that generates an ozone gas by silent discharge, for example. The ozone gas generated by the discharge cell 28 is supplied to a predetermined supply target.

The controller 50 is configured to control the power supply 51 and the flow control vale 43 individually. The controller 50 is constituted by using a microcomputer and a memory device (specifically a semiconductor memory) storing software for operating the microcomputer. The flow control vale 43 may be controlled by another controller outside the device body 20.

For example, the controller 50 adjusts an opening degree of the flow control vale 43 such that a flow rate of a raw material supplied to the device body 20 approaches a target flow rate. The controller 50 controls the power supply 51 such that the power supply 51 applies an alternating current to the discharge cell 28.

<Specific Configuration of Gas Conditioner>

A configuration of a gas conditioner (humidifier 60) will be described in detail with reference to FIGS. 2 through 4. The humidifier 60 includes a case 62 forming a gas channel 61 in which a gas flows, and a moisture adding unit 70 disposed in the gas channel 61.

The case 62 is made of a metal material. The case 62 is made of a material having a high thermal conductivity, e.g., a stainless material. The case 62 includes a case body 63, a flange 64, and a blocking plate 65. The case body 63 has a tubular (strictly, cylindrical) shape whose ends are open. The flange 64 is attached to one axial end (left end) of the case body 63, and closes the opening at this end. The blocking plate 65 is attached to the other axial end (right end) of the case body 63, and closes the opening at this end. A first gas pipe 66 is connected to a center portion of the flange 64. A second gas pipe 67 is connected to a center portion of the blocking plate 65. For example, the first gas pipe 66 constitutes a gas inflow pipe through which a gas in the first channel 31 flows into the gas channel 61, and the second gas pipe 67 constitutes a gas outflow pipe through which a gas in the gas channel 61 flows out to the second channel 32. The second gas pipe 67 may serve a gas inflow pipe with the first gas pipe 66 serving as a gas outflow pipe.

The case 62 is disposed in an air conditioning space S. The air conditioning space S is provided in semiconductor manufacturing facilities to which an air conditioning apparatus is introduced. Thus, the air conditioning apparatus maintains an air temperature in the air conditioning space S at a target temperature.

Figure 2:
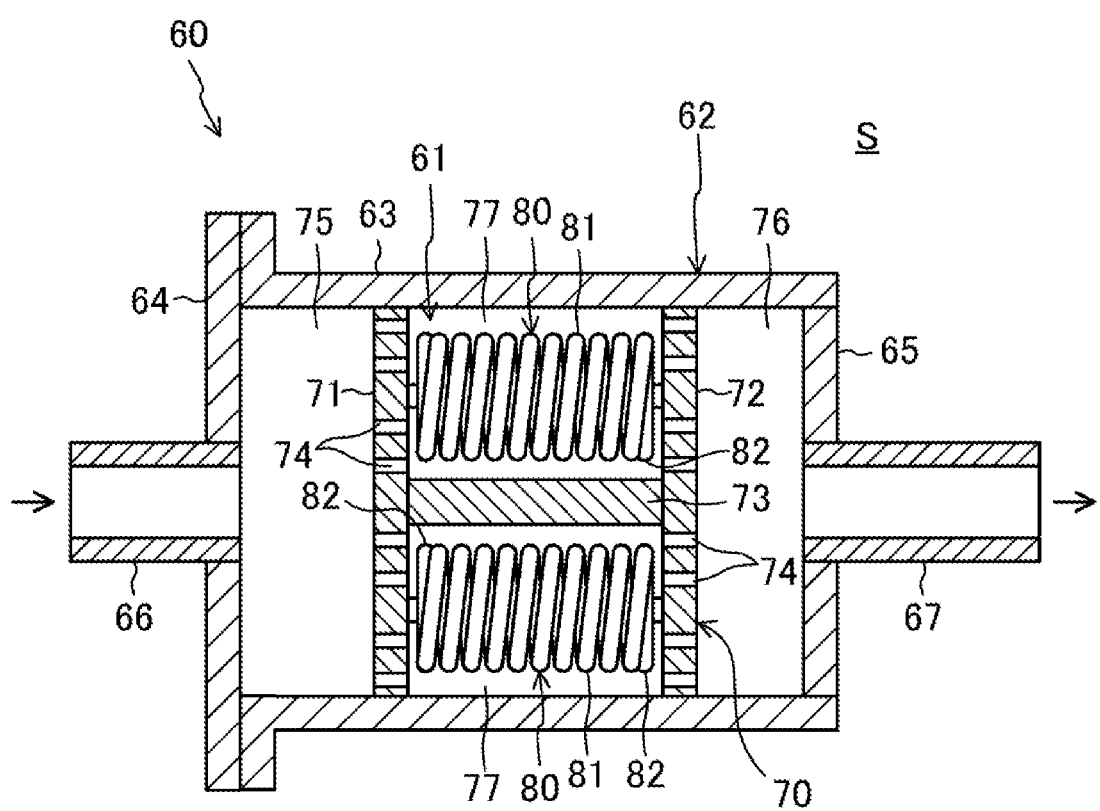
FIG. 2 is a schematic view of a gas conditioner according to an embodiment.

As illustrated in FIG. 2, the moisture adding unit 70 is disposed inside the case body 63. As illustrated in FIGS. 2 and 3, the moisture adding unit 70 includes a first separator 71, a second separator 72, a strut 73, and a plurality of resin tubes 80 (resin members).

The first separator 71 and the second separator 72 have circular plate shapes. The outer diameters of the first separator 71 and the second separator 72 are slightly smaller than the inner diameter of the case body 63. Accordingly, the first separator 71 and the second separator 72 are fitted in the case body 63. The first separator 71 is disposed close to the first gas pipe 66, and the second separator 72 is disposed close to the second gas pipe 67. A plurality of circular holes 74 are formed to penetrate each of the first separator 71 and the second separator 72 in an axial direction.

The strut 73 is interposed between the first separator 71 and the second separator 72. The strut 73 is a long cylindrical columnar member. A longitudinal end of the strut 73 is fastened to a shaft center portion of the first separator 71. The other longitudinal end of the strut 73 is fastened to a shaft center portion of the second separator 72.

A first header space 75 is formed between the flange 64 and the first separator 71. A second header space 76 is formed between the blocking plate 65 and the second separator 72. A humidifying channel 77 is formed between the first separator 71 and the second separator 72. The humidifying channel 77 is a part of the gas channel 61, and constitutes an accommodation chamber that accommodates the resin tubes 80.

Figure 3:
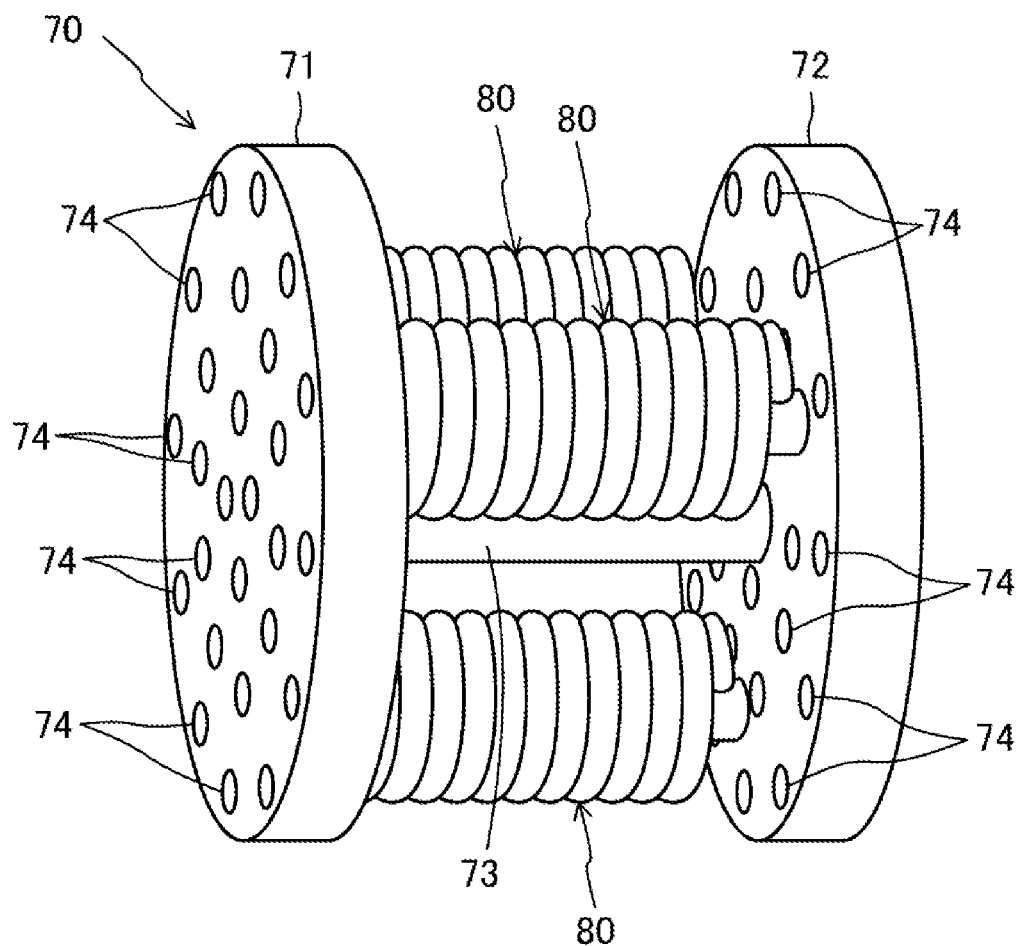
FIG. 3 is a perspective view of a moisture adding unit according to an embodiment.

As illustrated in FIG. 3, the moisture adding unit 70 includes three resin tubes 80. The number of the resin tubes 80 is merely an example. The number of the resin tubes 80 may be one or two, or four or more.

The resin tubes 80 according to this embodiment are made of a water-permeable resin material through which water is allowed to pass. For example, the resin tubes 80 are made of a fluorine-based resin material such as PTFE, PFA, ETFE, or FEP. Each of the resin tubes 80 is constituted by a hermetic hollow material configured to enclose water.

Each of the resin tubes 80 according to this embodiment has a helical shape. More specifically, each of the resin tubes 80 includes a helical peripheral wall portion 81, and a pair of closing portions 82 and 82 that close ends of the peripheral wall portion 81. The peripheral wall portion 81 has a helical shape that turns around an axis along a direction in which the first gas pipe 66 and the second gas pipe 67 extend. In other words, the peripheral wall portion 81 has a helical shape that forms a spiral along the inner peripheral surface of the case 62. The pair of closing portions 82 and 82 respectively closes openings at longitudinal ends of the peripheral wall portion 81. The pair of closing portions 82 and 82 is formed by melting opening edges of the peripheral wall portion 81 at the ends thereof with heat and then closing the openings. That is, the closing portions 82 constitute welded portions formed by welding the opening edges of the peripheral wall portion 81 at the ends thereof. In this manner, the resin tubes 80 enclosing water can be easily produced.

Figure 4:
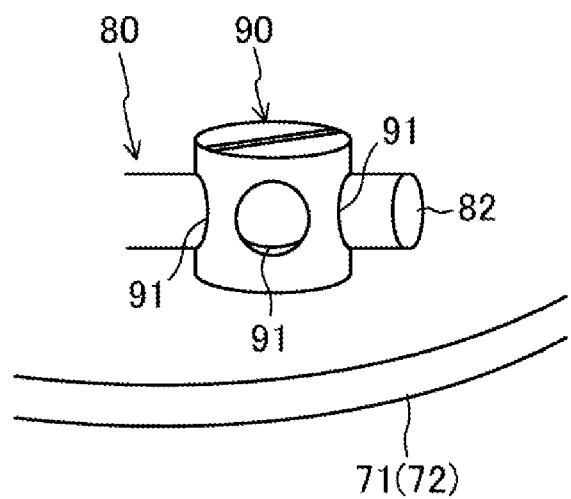
FIG. 4 is an enlarged perspective view of a fixture in a state where an end of a resin tube is fixed.

As schematically illustrated in FIG. 4, the plurality of resin tubes 80 are allowed to be attached and detached to/from the first separator 71 and the second separator 72. That is, the first separator 71 and the second separator 72 constitute supports configured to support the plurality of resin tubes 80 such that the resin tubes 80 can be attached to and detached from the first and second separators 71 and 72.

Specifically, each of the first separator 71 and the second separator 72 includes a fixture 90 for fixing the resin tubes 80. The fixture 90 has a cylindrical columnar shape having a plurality of through holes 91 each extending radially. A proximal end portion of the fixture 90 has a male thread (not shown). The male thread of the fixture 90 is fastened to a screw hole (not shown) formed in each of the first separator 71 and the second separator 72, thereby fixing the fixture 90 to each of the separators 71 and 72.

The outer diameter of an end portion of each resin tube 80 is slightly smaller than the diameter of the corresponding through hole 91 of the fixture 90. The end portion of the resin tube 80 is inserted in the through hole 91 of the fixture 90, thereby fixing the end portion of the resin tube 80 to the fixture 90. In this manner, the ends of the resin tube 80 are individually fixed to the fixtures 90 so that the resin tube 80 is thereby held between the separators 71 and 72. On the other hand, the ends of each resin tube 80 are pulled out from the through holes 91 so that the resin tube 80 is thereby removed from the separators 71 and 72.

Exemplary Operation

An operation (ozone generating method) for generating ozone in the ozone generator 10 will be described in detail.

When the ozone generator 10 is operated, an oxygen gas of the oxygen gas source 5 passes through the dehumidifier 27. In the dehumidifier 27, a dehumidification process of removing moisture in the oxygen gas from the oxygen gas source 5 to 10 ppb or less is performed. Accordingly, even if a certain content of moisture is included in the oxygen gas of the oxygen gas source 5 or the moisture content of the oxygen gas varies, the moisture content of the oxygen gas subjected to the removal process becomes substantially zero.

The oxygen gas having a moisture content of 10 ppb or less through the dehumidification process flows into the humidifier 60 from the first channel 31. In the humidifier 60, a humidification process of adding water to the oxygen gas is performed (which will be described later in detail). The humidifier 60 is supplied with the oxygen gas having a moisture content of substantially zero through the dehumidifier 27. Accordingly, even when a moisture content of the oxygen gas supplied from the oxygen gas source 5 slightly varies, for example, the moisture content of the oxygen gas supplied to the humidifier 60 hardly varies (remains zero). Thus, external factors affecting humidifying capacity of the humidifier 60 decrease so that a variation in the moisture content of the oxygen gas supplied from the first channel 31 to the second channel 32 can be thereby reduced.

<Details of Humidification Process>

In the humidification process described above, the oxygen gas flows in the first gas pipe 66, and then flows into the first header space 75. The oxygen gas in the first header space 75 is branched into the plurality of holes 74 of the first separator 71, and then flows into the humidifying channel 77.

In the humidifying channel 77, the oxygen gas flows around the plurality of resin tubes 80. At this time, water in the resin tubes 80 passes through the resin tubes 80, and moves into the oxygen gas. Accordingly, a trace amount of water is added to the oxygen gas. The oxygen gas provided with water is branched into the plurality of holes 74 of the second separator 72, and then combined in the second header space 76. The oxygen gas of the second header space 76 flows in the second gas pipe 67, and then is sent to the second channel 32.

In this humidification process, the temperature of air in the air conditioning space S around the case 62 is adjusted by an air conditioning apparatus. Since the case 62 is made of a stainless material having a high thermal conductivity, the temperature of a gas flowing in the gas channel 61 approaches the temperature of air in the air conditioning space S. The resin tubes 80 are disposed in the gas channel 61 so that the water temperature in the resin tubes 80 thereby approaches the temperature of a gas flowing in the gas channel 61. Accordingly, the water temperature in the resin tubes 80 approaches the temperature of air in the air conditioning space S, and thus, can be controlled by the air conditioning apparatus. Thus, the water temperature in the resin tubes 80 does not vary significantly, and thus, a variation in the amount of water released into a gas due to such a variation in water temperature can be reduced.

In the humidification process, while water in the resin tubes 80 is added to a gas, an oxygen gas passes through the resin tubes 80 to enter the inside of the resin tubes 80. Thus, even when water is released from the resin tubes 80, the internal pressure of the resin tubes 80 does not decrease significantly. Consequently, it is possible to reduce a change in the amount of water released into a gas due to a variation in the internal pressure of the resin tubes 80.

In the humidification process, a trace amount of water is added from the resin tubes 80 into the gas. Accordingly, the rate of decrease of water in the resin tubes 80 is extremely low, and a period until water in the resin tubes 80 runs out is sufficiently long. Thus, the resin tubes 80 do not need to be replaced frequently.

<Adjustment of Moisture Content>

In the humidifier 60 according to this embodiment, the amount of water released into the gas can be adjusted by changing the number of the resin tubes 80. Specifically, the amount of water added to the gas is increased by increasing the number of resin tubes 80 attached to the moisture adding unit 70. For example, in a case where the flow rate of a gas to be processed doubles or a target moisture content doubles, the number of resin tubes 80 is doubled. Accordingly, water in an amount in accordance with the gas flow rate or the target moisture content can be added to the gas simply by changing the number of resin tubes 80.

As a method for adjusting a moisture content, a factor except for the number of resin tubes 80 may be changed. Examples of this factor include the thickness, length, size, shape, material, and water permeability of the resin tubes 80.

Exemplary Advantages of Embodiment

Each of the resin tubes 80 according to this embodiment is constituted by a hermetic hollow material configured to enclose water. Thus, unlike conventional apparatus, a pump for transporting water and a chiller unit for adjusting the temperature of water to be transported, for example, are unnecessary. As a result, the amount of water added to a gas can be stably adjusted with a simple configuration of the humidifier 60.

The first separator 71 and the second separator 72 detachably support the plurality of resin tubes 80. Thus, in the humidifier 60, the number of resin tubes 80 can be easily changed, and the amount of water to be released can be easily adjusted. In addition, the resin tubes 80 can be replaced easily.

The ends of each of the resin tubes 80 have the closing portions 82 and 82 each formed by welding a resin. Thus, the resin tubes 80 enclosing water can be easily produced.

Since the resin tubes 80 have helical shapes, the volume and the surface area of the resin tubes 80 can be easily enlarged. When the volume of the resin tubes 80 increases, a period until water in the resin tubes 80 runs out becomes longer so that the frequency in replacing the resin tubes 80 can be reduced. When the surface area of the resin tubes 80 increases, the amount of water capable of being added to a gas can be increased. Accordingly, the resin tubes 80, and further the case 62, can be miniaturized.

The case 62 is made of a metal material, and is disposed in the air conditioning space S. Thus, the water temperature in the resin tubes 80 is dominated by the temperature in the air conditioning space S, and thus, the water temperature can be controlled as intended.

Variation of Embodiment

Figure 5:
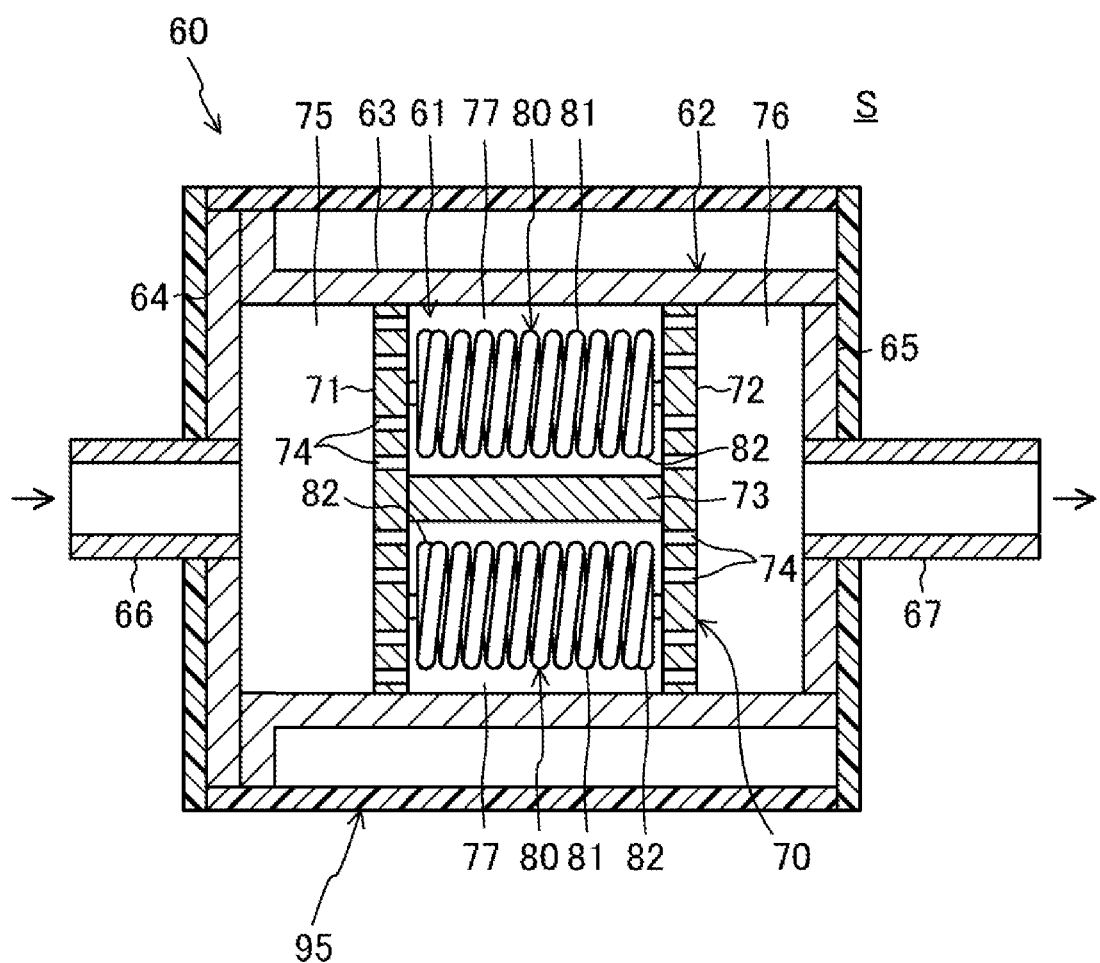
FIG. 5 is a schematic view of a configuration of a gas conditioner according to a variation.

As illustrated in FIG. 5, the periphery of the case 62 may be (partially or entirely) covered with a heat insulator 95. In this case, it is possible to reduce a change in the gas temperature of the gas channel 61 under the influence of the temperature around the case 62. Accordingly, the water temperature of the resin tubes 80 is dominated by the gas temperature of the gas channel 61. Thus, the water temperature of the resin tubes 80 can be controlled to be constant by using the temperature of a gas flowing in the gas channel 61.

Other Embodiment

In the embodiment described above, the resin member 80 is constituted by helical resin tubes. Alternatively, the resin member 80 may have any structure as long as the resin member 80 is a hermetic hollow material configured to enclose water. For example, the resin member 80 may have a ring shape. In this case, a ring-shaped resin member 80 having a small diameter can be disposed inside a ring-shaped resin member 80 having a large diameter. The resin member 80 may have a rod shape, a flat-plate shape, an arc shape, or a rectangular solid shape, for example.

A target gas of the gas conditioner 60 according to this embodiment is an oxygen gas. The target gas, however, is not limited to the oxygen gas, and may be other gases such as a nitrogen gas, a carbon dioxide gas, or air. Water to be added to a gas by the gas conditioner 60 may not be pure water, and may be water containing other components (e.g., fresh water or tap water).

The humidifier 60 is disposed in the device body 20 in the embodiment but may be disposed outside the device body 20.

INDUSTRIAL APPLICABILITY

As described above, the present invention is useful for a gas conditioner.

The invention claimed is:

1. A gas conditioner configured to add water to a gas, the gas conditioner comprising:
   a case forming a gas channel in which the gas is distributed; and
   a resin member disposed in the gas channel and having water permeability,
   wherein:
   the resin member is constituted by a hermetic hollow material configured to enclose water,
   the resin member comprises a plurality of resin members, and
   the gas conditioner further comprises a support configured to support the plurality of resin members such that the plurality of resin members are allowed to be attached to and detached from the support.

2. The gas conditioner according to claim 1, wherein:
   the resin member includes a tubular peripheral wall portion and a closing portion configured to close each end of the peripheral wall portion, and
   the closing portion is constituted by a welded portion of a resin material.

3. The gas conditioner according to claim 1, wherein the resin member has a helical shape.

4. The gas conditioner according to claim 1, wherein the case is made of a metal material and disposed in an air conditioning space where an air temperature is adjusted.

5. A gas conditioner configured to add water to a gas, the gas conditioner comprising:
   a case forming a gas channel in which the gas is distributed; and a resin member disposed in the gas channel and having water permeability, wherein:
the resin member is constituted by a hermetic hollow material configured to enclose water,
the resin member includes a tubular peripheral wall portion and a closing portion configured to close each end of the peripheral wall portion, and
the closing portion is constituted by a welded portion of a resin material.

6. The gas conditioner according to claim 5, wherein the resin member has a helical shape.

7. The gas conditioner according to claim 5, wherein the case is made of a metal material and disposed in an air conditioning space where an air temperature is adjusted.

8. A gas conditioner configured to add water to a gas, the gas conditioner comprising:
a case forming a gas channel in which the gas is distributed; and
a resin member disposed in the gas channel and having water permeability,
wherein:
the resin member is constituted by a hermetic hollow material configured to enclose water, and
the resin member has a helical shape.

9. The gas conditioner according to claim 8, wherein the case is made of a metal material and disposed in an air conditioning space where an air temperature is adjusted.

* * * * *